United States Patent
Mayes et al.

[11] 3,725,374
[45] Apr. 3, 1973

[54] CURED NITROSOFLUOROCARBON RUBBER

[75] Inventors: Nathan Mayes, Barrington, R.I.; Joseph E. Green, Brunswick; Ronald Michaels, Boonton, both of N.J.

[73] Assignee: Thiokol Chemical Corporation, Bristol, Pa.

[22] Filed: Oct. 30, 1970

[21] Appl. No.: 85,758

[52] U.S. Cl. ............... 260/92.1, 117/138.8, 149/23, 149/74, 260/30.4, 260/487, 260/539, 260/544, 260/830
[51] Int. Cl. .................................. C08f 3/24
[58] Field of Search............. 260/92.1, 487, 544, 539

[56] References Cited

UNITED STATES PATENTS

| | | |
|---|---|---|
| 3,065,214 | 11/1962 | Rose.....................260/92.1 |
| 3,197,451 | 7/1965 | Haszeldine..............260/92.1 |
| 3,321,454 | 5/1967 | Crawford et al.........260/92.1 |
| 3,417,068 | 12/1968 | Knoll.....................260/92.1 |

*Primary Examiner*—Harry Wong, Jr.
*Attorney*—Curtis, Morris and Safford

[57] ABSTRACT

A cured, nitroso polymer has been provided by curing polymers obtained by polymerizing monomers which have pendant groups convertible to pendant moieties which are crosslinkable. Some of these monomers with the crosslinkable, pendant groups cannot be introduced into the polymer directly. The polymers with the pendant groups are derived from monomers forming recurring units as represented by the general formulas:

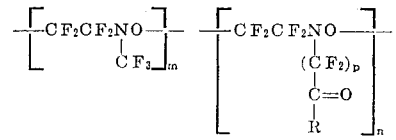

or

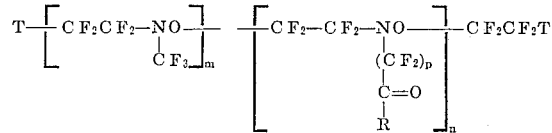

wherein R is a —O—(lower alkyl) group of one to seven carbon atoms; $p$ is from 1 to 6; T is a halogen, a perhaloalkyl, —NO, and —NO$_2$; and the ratio $m : n$ is from 0 : 1 to 50 : 1, preferably $n$ can be from 0.1 percent to 10 percent of the units in the polymer. The polymers are cured with such curing agents as an epoxide, a metal oxide, and chromium perfluoroacetate to produce rubbers having good physical properties and chemical resistance. Thus, liquid and solid polymers are provided as well as elastomers derived therefrom.

6 Claims, No Drawings

CURED NITROSOFLUOROCARBON RUBBER

This application relates to nitroso rubbers and more particularly to solid and liquid nitroso rubber prepolymers capable of being cured to rubbery polymers.

In recent years there has been an increasing interest in nitroso rubbers because of their exceptional resistance to solvent and chemical attack. They are particularly outstanding in their resistance to attack by strong corrodents such as oxidizing agents and are of interest as materials for making gaskets, diaphragms, flexible containers, etc., which are to be exposed to such oxidizing agents. Typical applications are propellent systems wherein one of the components is a strong oxidizer and systems wherein highly fluorinated reagents are used.

The earlier types of nitroso rubbers were commonly made by copolymerization of tetrafluoroethylene and trifluoronitrosomethane. While such copolymers have the sought-after chemical properties, their physical properties leave something to be desired; and they cannot be readily cured or vulcanized to obtain a rubber having acceptable strength and elastic properties.

While solid, curable rubbers are useful for many of the applications noted above, there are other applications, where it is desirable to have a rubber prepolymer in liquid form capable of being cast or otherwise caused to flow into an irregular, confined space and thereafter converted into a rubber.

It is accordingly an object of the present invention to obtain cured polymers and to cure the polymers as depicted by recurring units based on the monomer derivatives of the following formulas:

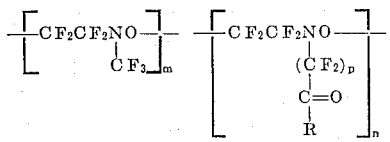

and/or

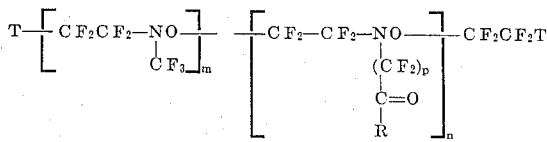

wherein R is a —O—(lower alkyl) group of one to seven carbon atoms; $p$ is from 1 to 6; T is a halogen, a perhaloalkyl, —NO, and —NO$_2$; and the ratio $m : n$ is from 0 : 1 to 50 : 1. An optimum ester termonomer derivative constitutes 1 to 15 mole percent preferably up to about 10 mole percent of the depicted ester monomer.

It is another object of the present invention to cure a liquid nitroso rubber prepolymer to provide a nitroso rubber having good physical properties. Other objects and advantages of the invention will be in part obvious and in part pointed out hereafter.

As indicated by the above formula, the termonomer is an ester. Thus it may be nitrosoperfluoroacetic acid ester, nitrosoperfluoropropanoic acid ester, or the corresponding butyric, pentanoic, hexanoic, or heptanoic acid ester, i.e., a lower alkyl ester of such an acid. The methyl or ethyl ester is preferred.

As the ester monomer in the nitroso copolymer, the nitroso perhalo acetic esters have been found most useful. These precursor monomers are represented by the following formula:

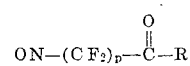

wherein R is —O—(lower alkyl) radical; wherein $p$ is 1 to 6. A preferred and most desirable sub-group of these compounds are the lower alkyl esters of the nitroso perhalo acetic acid. The lower alkyl moiety in the depicted esters is such as methyl, ethyl, propyl, iso-propyl, butyl, isobutyl, pentyl, hexyl, and heptyl.

The esters may be prepared as described in the Paustian et al. application Ser. No. 569,797, filed Aug. 3, 1966. The ester moiety containing polymer may also be prepared as illustrated in Mayes et al. application Ser. No. 775,528, filed Nov. 13, 1968. These applications are incorporated by reference herein.

As indicated above for the liquid polymers the terminator is a halogen such as elemental chlorine, bromine, or iodine, a perfluoroalkyl halide, preferably a halide wherein the alkyl group contains one to four carbon atoms, e.g., perfluoromethyl chloride, perfluoroethyl bromide, or perfluoroethyl iodide, or nitric oxide or nitrogen dioxide. The terminator is desirably used to the extent of 1 to 10 mole percent based on the total moles of monomer in the polymerization reaction mixture. The preferred terminator is elemental chlorine since it has been found that by using chlorine, a relatively high degree of control of the fluidity of the product polymer can be achieved by varying the amount of chlorine used.

The molar ratios of trifluoronitrosomethane, tetrafluoroethylene and the termonomer in the reaction mixture are preferably in the range 1:2:1 to 1:1.02:0.02. The polymerization reaction period may be 20 to 150 hours but is usually between 48 and 90 hours.

To amplify the distinctions between the liquid and solid polymer, the polymerized products are liquid nitroso rubber prepolymers having molecular weights below about 20,000 and viscosities ranging from 1,000 to 300,000 cp at 25°C. When no radical chain terminator is used, solid gum-like polymers are obtained. The molecular weight for these polymers is determined by viscosity measurements of similar polymers displaying approximate viscosity-molecular weight correlations applicable to the polymers herein. On the basis of these data, the molecular weights of the liquid polymers are generally below about 20,000 while the molecular weights of the solids, i.e., gums, range up to 1,000,000 with 500,000 and 300,000 being a fairly representative upper range of various polymer species, the lower range being the previously defined limit of liquid polymers. Of course, a very sharp demarkation based on physical properties is not encountered; and hence, these ranges must be understood as being only convenient means for classification.

Curing of the ester moiety is accomplished directly with an epoxide, a metal oxide, and metal salts such as chromium III triperfluoroacetate and chromium triacetate.

Suitable epoxy curatives are vinyl cyclohexene dioxide, polyepoxy compounds such as dicyclopentadiene dioxide and various epoxy resins, e.g., Epon 828-a reaction product of bis-phenol A and epichlorohydrin (Shell Chem. Co.), EP-201-3,4-epoxy-6-methyl cyclohexyl methyl-3,4-epoxy-6-methyl cyclohexane carboxylate (Union Carbide Chem. Co.), also known as Unox 201, as well as epoxy plasticizers, e.g. Paraplex G62-Rohm & Haas Co. and Emery 3051R-Emery Industries, Inc. In general these epoxides are cyclical diepoxides or a compound of the general formula:

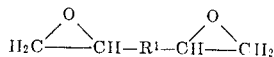

wherein $R^1$ is an aliphatic or hydrocarbon moiety or an alicyclic moiety of up to 10 carbon atoms.

Suitable metal oxides are magnesium oxide which is preferred and calcium oxide, zinc oxide, cadmium oxide, or barium oxide as well as mixtures of the aforesaid oxides.

Curing of the polymer is effected at temperatures up to about 250°C; from 50°C to 200°C is a more suitable temperature range for both liquid and solid curable polymers. Curing at the above temperatures may be carried out up to about 24 hours with stepwise increases in curing temperature if needed. Illustrative examples of curing procedures are given in the specific examples. A suitable range for the amount of curing agent added to the polymer is from 0.5 to 10 percent based on weight of the polymer. For the epoxide the preferred range is up to 5 percent and for the chromium compound, up to 2.5 percent.

The following examples are illustrative of the above-described invention; however, these examples are offered for purpose of depicting the invention and are not to be construed as limiting the broader scope of the described invention.

General Preparation of the Polymers

EXAMPLE A

This example describes the general method followed for preparing the polymers and in this instance illustrates the preparation of a copolymer of recurring units derived from methyl nitroso difluoro acetate and tetrafluoroethylene. The vessel used for this preparation was a heavy wall Pyrex tube of 100 ml volume. It was fitted with a metal screw cap assembly including a Hoke needle valve for charging and discharging gases. The screw cap seal to glass was made with a Viton O-Ring.

Reagent grade methylene chloride, 16 ml, and methyl difluoro nitroso acetate ($ONCF_2COOCH_3$; 4.8 g, 0.035 mole), were charged, as liquids, to the reaction vessel which was cooled to liquid nitrogen temperature (−196°C), evacuated using the needle value, and all air removed by the freeze-thaw method. Tetrafluoroethylene ($C_2F_4$; 3.5 g; 0.035 mole) was then charged to the vessel by condensing it at liquid nitrogen temperature therein. The needle valve was closed and the reaction initiated by placing the vessel in a liquid bath maintained at −25°C and agitating by shaking for 90 hours.

The product was obtained, after venting gaseous unreacted monomer and removal of solvent by evaporation, as a clear, colorless soft gum polymer weighing 5.4 g. (65 percent yield). Infrared analysis confirmed the structure as $ONCF_2COOCH_3/C_2F_4$ copolymer with absorptions in the 7.7 to 8.8 micron region indicative of $>CF_2$, at 5.6 microns, indicative of $>C=O$, and at 3.4 microns for $>CH_2$.

EXAMPLE 1

A terpolymer of nitroso trifluoro methane, tetrafluoro ethylene and methyl difluoro nitroso acetate were prepared by following the same procedure as in Example A, except that after charging $C_2F_4$, the required quantity of $CF_3NO$ was also charged by condensing it at liquid nitrogen temperature in the vessel.

The reactants and solvents were used in the following amounts:

| | | |
|---|---|---|
| $CF_3NO$ | 6.93 g. | 0.07 mole |
| $C_2F_4$ | 10.00 g | 0.10 mole |
| $ONCF_2COOCH_3$ | 4.18 g | 0.03 mole |
| $CH_2Cl_2$ | 35 g | |

The reaction was conducted at 0°C for 90 hours. Product was obtained as a gum, weighing 16 g (yield 76 percent). Infrared analysis indicated the terpolymer structure by absorptions at 3.4 microns for $>CH_2$ at 5.6 microns for $>C=O$ and in the 7.7 to 8.8 micron region for $>CF_2$ and $-CF_3$. The product is curable with calcium oxide.

EXAMPLE 2

A terpolymer of nitroso trifluoro methane, tetrafluoro ethylene and ethyl difluoro nitroso acetate was prepared by following the same procedure as in Example 1.

The reactants and solvent were used in the following amounts:

| | | |
|---|---|---|
| $CF_3NO$ | 3.96 g | 0.04 mole |
| $C_2F_4$ | 5.0 g | 0.05 mole |
| $ONCF_2COOC_2H_5$ | 1.53 g | 0.01 mole |
| $CH_2Cl_2$ | 21 g | |

The product was a clear, colorless gum weighing 7.3 g (69.5 percent yield). Infrared analysis indicated the terpolymer structure with absorptions at 3.32 microns for $>CH_2$, at 5.63 microns for $>C=O$, at 7.3 microns for $>C-CH_3$, and in the 7.7 to 8.8 micron region for $>CF_2$ and $-CF_3$.

Two grams of the gum product were mixed with 0.2 grams of UNOX 201 (Union Carbide Trademark for a dicyclo diepoxy carboxylate) and heated at 110°C for 24 hours. During this time the gum cured to an elastomeric solid with Shore A hardness of 45.

EXAMPLE 3

A terpolymer of nitroso trifluoro methane, tetrafluoro ethylene and difluoro nitroso ethyl acetate was prepared in suspension as follows:

In a 300 ml capacity stirred autoclave (Autoclave Engineers, Inc.) was introduced 50 ml of distilled water containing 20 g of lithium bromide (freezing point depressant) and 1.5 g of magnesium carbonate (suspending agent). The liquid monomer, ethyl difluoro nitroso acetate ($ONCF_2COOC_2H_5$, 1.39 g, 0.01 mole) was then added and the mixture was degassed by the freeze-thaw method. Trifluoro nitroso methane (3.96 g, 0.04 mole) and tetrafluoro ethylene (5.0 g, 0.05 mole) were charged as gases under pressure to the autoclave at −25°C. The autoclave was sealed, and the mixture stirred for 24 hours at −25°C. The product was obtained as a finely divided, white solid in suspension which coagulated to a gum rubber upon acidification of the suspension with aqueous hydrochloric acid. The weight of the product was 8.3 g (80 percent yield). Infrared analysis showed absorptions at 3.32 microns for $>CH_2$, at 5.65 microns for $>C=O$ and at 7.3 microns for $>C-CH_3$. There was no evidence that hydrolysis of ester groups had occurred. The above polymer is curable with chromium III triperfluoro acetate.

EXAMPLE 4

Terpolymerization of nitroso trifluoro methane, tetra fluoro ethylene, and ethyl difluoro nitroso acetate was carried out in bulk as follows:

The liquid monomer $ONCF_2COOC_2H_5$ (1.39 g, 0.01 mole) was added to a Pyrex reactor tube and the same degassed by the freeze-thaw method. To the evacuated reactor was then added by condensing the gases at liquid nitrogen temperature trifluoro nitroso methane (3.96 g, 0.04 mole) and tetrafluoro ethylene (0.50 g., 0.05 mole). The vessel was then sealed, allowed to warm to −50°C and remained at this temperature for 20 days. The product was obtained as a clear, rubbery gum of weight 8.9 g (86 percent yield). The infrared spectrum showed the presence of ethyl ester by absorptions at 3.32, 5.65, and 7.3 microns.

As an indication of molecular weight, the intrinsic viscosity of the product in perfluoro tributyl amine solution was determined to be 0.4. The relationship of intrinsic viscosity to molecular weight is $[\eta]=KM^a$. The values of K and $a$ for $CF_3NO/C_2F_4$ copolymer in perfluoro tributyl amine solution are $8.77 \times 10^{-5}$ and 0.66, respectively. An approximate molecular weight of the $CF_3NO/C_2F_4/ONCF_2COOC_2H_5$ terpolymer obtained using these constants for the approximation is therefore 300,000. The above polymer is curable with magnesium oxide.

EXAMPLE 5

13.86 g. (0.14 mole) of $CF_3NO$, 20 g. (0.20 mole) of $CF_2=CF_2$, 14.34 g. (0.06 mole) of $ON(CF_2)_3COOCH_3$, and 0.092 g. of $NO_2$ were charged to a Pyrex ampule containing 100 ml. of methylene chloride. The ampule was sealed and agitated at 0°C for 90 hours to obtain 42.5 g. of yellow liquid polymer of viscosity 22,500 cp at 25°C. Infrared and $F^{19}$ n.m.r. analyses indicated the structure of the product to be:

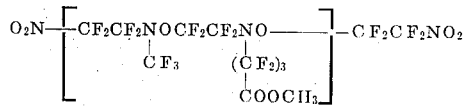

The ester liquid polymer is cast to a film which is cured and is subjected to physical property measurements. For example, 4 g. of the polymer is curable with 0.66 g. of UNOX—207X (dicyclopentadiene dioxide). The film is cured by heating for 10 hours at 90°C. The cured film has an approximate tensile strength of about 980 p.s.i., elongation of about 75 percent, and hardness (Shore A) of about 72.

EXAMPLE 6

$CF_3NO$ 75.735 g., (0.7650 mole), $CF_2=CF_2$ (90 g., 0.9 mole), $ON(CF_2)_3COOCH_3$ (30.375 g., 0.1350 mole), and $Cl_2$ (7.668 g., 0.108 mole) are condensed into a 1,000 ml. heavy-walled Pyrex polymerization vessel containing 406 ml. of methylene chloride. The vessel is sealed and is agitated for 90 hours at −40°C. Upon opening of the vessel and removing the volatile products and solvent, 177 g. of liquid polymer is obtained.

2.0 g. of liquid ester terpolymer is mixed with 0.16 g. of finely pulverized chromium triflouroacetate for a period of five minutes. A film of approximately 30 mil thickness is spread upon a sheet of Teflon FEP polymer. This film is placed in an oven at 50°C and after sixteen hours the temperature is increased to 90°C to cure the product for 4 hours.

As it is evident from above, the curing of liquid and solid pendant ester groups containing polymers is effected with the above-described curing agents without a need to convert the pendant ester group to a carboxylic group. Hence, an hydrolysis step of these polymers may be eliminated as well as a number of polymers such as derived from alkyl nitroso perfluoroacetates can be used to a great advantage, heretofore not possible when using the corresponding acid moiety containing polymer precursor.

It is of course to be understood that the foregoing examples are intended to be illustrative only and that numerous changes can be made in the ingredients, proportions and conditions set forth therein without departing from the spirit of the invention as defined in the appended claims.

What is claimed is:

1. A cured polymer derived from monomers forming recurring units represented by the general formula:

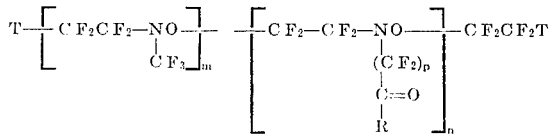

wherein R is an —O—(lower alkyl) group of one to seven carbon atoms and $p$ is from 1 to 6, and T is a halogen, a perhaloalkyl, —NO, or —NO$_2$; and the ratio $m : n$ is from 0 : 1 to 50 : 1, and, as an incorporated curing agent, 0.5 to 10 percent by weight based on the polymer, a metal oxide selected from the group consisting of magnesium oxide, calcium oxide, zinc oxide, cadmium oxide, barium oxide, mixtures of the aforesaid oxides, a cyclic diepoxide, a linear diepoxide, chromium III triperfluoroacetate, or chromium triacetate.

2. A cured polymer according to claim 1 wherein T is chlorine and the curing agent is magnesium oxide.

3. A cured polymer according to claim 1 wherein the lower alkyl moiety is methyl or ethyl and the curing agent is chromium III triperfluoroacetate.

4. A cured liquid polymer according to claim 1 wherein the liquid polymer has a viscosity of 1,000 to 300,000 cp at 25°C.

5. A cured liquid polymer according to claim 1 wherein the lower alkyl is methyl, T is chlorine, and the curing agent is dicyclopentadiene dioxide.

6. A method of curing a nitrosofluorocarbon polymer of the formula

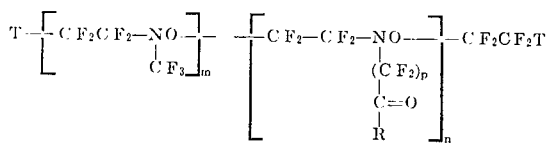

wherein $p$ is 1 to 6, R is an —O—(lower alkyl) alkyl group of one to six carbon atoms, and T is a halogen, a perhalo alkyl, —NO, or —NO$_2$; and the ratio $m{:}n$ is from 1:1 to 50:1, which comprises adding to said polymer from 0.5 to 10 percent, by weight, of a curing agent which is a cyclic diepoxide, a metal oxide selected from the group consisting of magnesium oxide, calcium oxide, zinc oxide, cadmium oxide, barium oxide, mixtures of the aforesaid oxides, chromium triacetate or chromium trifluoroacetate, and heating the resulting mixture to produce a cured polymer.

* * * * *